United States Patent [19]

Tezuka et al.

[11] 4,329,369
[45] May 11, 1982

[54] PROCESS FOR PREPARATION OF CHEWING GUM

[75] Inventors: Shichigoro Tezuka, Kawasaki; Yoshinori Sato, Niiza; Masaki Shibata, Tokyo; Nobuyuki Harikae, Funabashi, all of Japan

[73] Assignee: Lotte Co., Ltd., Tokyo, Japan

[21] Appl. No.: 169,748

[22] Filed: Jul. 17, 1980

[30] Foreign Application Priority Data

Mar. 3, 1980 [JP] Japan ................... 55-25210

[51] Int. Cl.³ .............................. A23G 3/30
[52] U.S. Cl. ........................................ 426/3
[58] Field of Search ........................ 426/3–6, 426/549

[56] References Cited

U.S. PATENT DOCUMENTS 3,854,627 12/1974 Coons ..................................... 426/3
3,883,666 5/1975 Teng ...................................... 426/3

*Primary Examiner*—Jeanette M. Hunter

[57] ABSTRACT

A single step process for preparation of chewing gum is disclosed wherein all materials comprising gum base materials including natural resin, vinyl acetate resin, polyisobutylene, ester gum, emulsifier, filler and others on one hand, as well as chewing gum additives including sucrose, glucose, starch hydrolysate, artificial sweetener, flavor, colorant and others on the other hand were charged into a single apparatus and kneaded simultaneously in a single step.

As the kneading apparatus, and intensive mixer, a Banbury mixer or a pressure type kneader may be employed.

6 Claims, No Drawings

PROCESS FOR PREPARATION OF CHEWING GUM

TECHNICAL FIELD OF THE INVENTION

This invention relates to a process for preparation of chewing gum, more particularly to a process for preparation of chewing gum which comprises kneading chewing gum base materials with chewing gum additives simultaneously in a single step by means of a single apparatus.

BACKGROUND ART

Heretofore, a chewing gum of any type including a plate type and a bubble type has been prepared in two separate steps, namely the steps of gum base preparation and chewing gum preparation. In the first step of gum base preparation, gum base materials including natural resin such as chicle and jeltong, vinylacetate resin, polyisobutylene, ester gum, plasticizer, emulsifier, filler and others are kneaded for 3 to 4 hours per ton of materials by means of a usual open-kneader to produce a viscous gum base of a temperature ranging about 110° to 120° C. In the second step of chewing gum preparation, the gum base produced by the foregoing first step is kneaded with chewing gum additives including sugar, glucose, starch hydrolysate, artificial sweetener, flavor, coloring agent and others by means of a usual mixer for about 30 minutes per ton of materials to produce a chewing gum of a temperature ranging about 50° to 60° C. In the second step, preferably, the gum base produced by the first step and a half amount of sugar as well as starch hydrolysate are charged into the mixer and mixed, and then the remaining half amount of sugar and a softener are charged and thoroughly mixed. Finally, a flavor is added and trated for approximately one minute to produce a chewing gum. The chewing gum mass thus obtained through these two steps is subjected to a shaping process to produce various chewing gum products as disclosed in the U.S. Pat. Nos. 3,995,064 and 4,187,320.

In the conventional process hitherto exercised, a chewing gum has always been prepared through the two steps, namely steps of gum base preparation and chewing gum preparation. Up to date there has been no means to employ a single step process in lieu of the two step process. This is presumably due to the fact that the presence of sucrose and glucose in the severe kneading condition of the temperature of 110° to 120° C. for 3 to 4 hours required in the first step of gum base preparation causes thermal decomposition of the sugars, having an adverse effect on the quality of the chewing gum product.

As a result of diligent study for achieving simplification of the process for saving energy and improving quality of chewing gum, it has now been found out that the kneading of usual gum base materials with chewing gum additives under pressure by means of, for example, a pressurizing apparatus such as an intensive mixer, a Banbury mixer or a pressure-kneader (dispersion mixer) may provide a better and more brief operation (for example, within about 10 to 15 minutes) at about 40° to 60° C. in a single step without separating the gum base preparation step from the chewing gum preparation step, and yet can produce the chewing gums having uniform and improved quality.

DISCLOSURE OF THE INVENTION

It is, therefore, an object of the invention to provide a process for preparation of a chewing gum which may achieve energy saving, improved quality and simplified process, using a single step with a single apparatus.

In consideration of the fact that the conventional chewing gum has been produced in the two steps, namely the steps of gum base preparation and chewing gum preparation and that the kneading treatment is effected at a high temperature of 110°–120° C. for a long time of 3 to 4 hours per ton of materials in the first step of gum base preparation, it would be unexpected in the art that the kneading at a low temperature of 40° to 60° C. for a short period of time of 10 to 15 minutes in a single step may produce a comparative or even better chewing gum product, resulting in energy saving and cost reduction.

The object of the invention hereinbefore described may be achieved according to the invention by providing a process which comprises kneading under pressure simultaneously in a single step conventional chewing gum base materials including natural resin, vinyl acetate resin, polyisobutylene, ester gum, plasticizer, emulsifier, filler and others on one hand with usual chewing gum additives including sucrose, glucose, starch hydrolysate, artificial sweetener, flavor, coloring agent and others on the other hand.

DETAILED DESCRIPTION OF THE INVENTION

The gum base materials used in this process according to the invention are known in the art and include, for example, natural resin, such as chicle, jeltong or the like; vinyl acetate resin; synthetic rubber, such as polyisobutylene, polyisoprene, butylene-styrene rubber or polybutadiene rubber; ester gum; natural or synthetic plasticizer, such as micro-crystalline wax, methyl acetyllicinoleate or the like; filler, such as calcium carbonate, talc or the like; emulsifier, such as monoglyceride. These usual materials may be used in a usual amount well-known in the art. Further, the types and proportions of the material may be varied depending on the type of chewing gum, for example, plate-type or bubble type, by employing the well-known conventional technique.

The chewing gum additives used in the process according to the invention are also well-known in the art and include, for example, sweetener such as sucrose, glucose, starch hydrolysate and the like; single or mixed flavor, such as peppermint, spearmint, coffee, fruit, menthol, spirit, pickled ume or others; humectant, such as glycerine, sorbitol; surfactant; antioxidant; softening agent; artificial sweetener; coloring agent; and if appropriate vitamins, salts and other medical or nutritive substances. These known additives may be employed with the conventional amounts well-known in the art. Further, the types and proportions of the additives may be optionally varied depending on the type of chewing gum, such as plate, bubble, sugarless, center-filled, sport, cold-proof types of chewing gum, by employing the well-known conventional technique.

The essential feature of the invention resides in that in order to avoid the severe conditions for the conventional two step operation, especially the first step of gum base preparation where a preheated open-kneader is charged with high melting materials at first and then with lower melting materials successively, which are kneaded for a long time of 3 to 4 hours per ton of materials under observation of kneading state to produce the viscous gum base of a temperature of 110° to 120° C., the gum base materials and chewing gum additives may be kneaded simultaneously in a single step using a single apparatus for much shorter time of about 10 to 15 minutes to produce any type of chewing gum having a lower temperature of about 50° C.

The kneading in the single step is carried out, in accordance with the invention, for a short time under increased pressure. The pressure applied on a pressurizing lid of an apparatus may be generally in the range of about 4 to 10 $Kg/cm^2$, preferably about 6 to 8 $Kg/cm^2$. The temperature of the mass obtained, in general, ranges about 50° to 60° C., preferably about 53° to 56° C., and the kneading time is generally in the range of about 10 to 25 minutes, preferably about 10 to 15 minutes. It will be appreciated that these kneading conditions are much more mild than the conventional severe conditions of 110° to 120° C. for 3 to 4 hours per ton of materials.

In the conventional process, as stated hereinbefore, the severe condition for preparing the gum base makes it impossible to add sugars and flavors to the materials in the first step, in view of decomposition of the sugars and volatility of the flavor under such severe conditions. On the contrary, in accordance with the invention, it will be appreciated that the use of the outstandingly mild conditions for kneading enables the gum base materials and chewing gum additives, especially sugars and flavor, to be simultaneously added and kneaded in the single step without an adverse effect on the chewing gum product. If the volatility of flavor is taken into consideration, however, it is preferred that all materials (including the gum base materials and chewing gum additives) excluding the flavor may be kneaded simultaneously under increased pressure and subsequently the flavor may be added and treated for a short time, for example, about one minute.

The single step kneading under pressure according to the invention may be carried out by means of a conventional apparatus well-known in the art, such as an intensive mixer, a Banbury mixer or a pressure-type kneader (or a dispersion mixer), but any other types of kneaders or mixers capable of generating the desired pressure condition may be employed. Regardless of the selected type of apparatus, the kneading process may be completed only with the selected single apparatus resulting in simplification of the process and reduction of investment cost, in comparison with the conventional process in the two step operation using two types of apparatus, such as an open-kneader for the gum base preparation and an open-mixer for the chewing gum preparation.

In accordance with the invention, the chewing gum may be produced in the single step process with much shorter time and lower temperature than the conventional two step process, so that the following advantages may be achieved:

(1) Variability of product quality may be reduced due to the single step operation.
(2) Manufacturing time may be extremely reduced. For example, the time for conventional plate type gum of 80 minutes may be reduced to 15 minutes according to the invention and that for bubble type gum of 50 minutes may be also reduced to 15 minutes.
(3) Energy may be saved. Namely, in the conventional process the kneading for several hours and at 110° to 120° C. has been required only for the gum base preparation, whereas the kneading for 10 to 15 minutes and at 40° to 60° C. is enough for the whole process (including the gum base preparation and chewing gum preparation), so that the energy saving may be clearly achieved.
(4) The process may be simplified, so that the investment cost may be extremely reduced and the significant rationalization may be achieved.
(5) The gum base materials are never subjected to the high temperature, so that deterioration of quality, such as pyrolytic odor and taste, may be prevented: and
(6) A polymeric rubber used in the gum base is subjected only to the mild conditions in the single step kneading, so that the molecular size of the rubber is prevented from decreasing and kept large, thereby maintaining the high elasticity with good feeling.

The following examples illustrate the invention, wherein percentages are expressed by weight unless otherwise being noted.

EXAMPLE 1

(Plate-type gum)

The indicated amount of the materials described below are kneaded in a single step in accordance with the invention to produce a plate-type gum.

| | | | |
|---|---|---|---|
| Natural resin | 5% | Powdery sugar | 54.0 |
| Vinyl acetate resin | 5 | Glucose | 10 |
| Polyisobutylene | 2.4 | Starch hydrolysate | 10 |
| Ester gum | 3 | Glycerine | 5 |
| Monoglyceride | 0.6 | Flavor | 1 |
| Micro-wax | 1.6 | Total | 100 |
| Calcium carbonate | 2.4 | | |

An intensive mixer was charged with the gum base materials comprising natural resin, vinyl acetate resin, polyisobutylene, ester gum, monoglyceride, micro-wax and calcium carbonate, as well as the chewing gum additives including powdery sugar, glucose, starch hydrolysate and glycerine and then a pressure of about 7 $Kg/cm^2$ was applied on a pressurizing lid, thereby forcing the materials into the mixer. Thereafter, kneading operation was commenced. After the materials were homogenized the lid was removed for adding the flavor and the kneading was continued for one minute. The total required time was about 15 minutes and the temperature of the gum base was in the range of 53° to 58° C. Thus prepared chewing gum was removed and shaped in a conventional manner into the plate type gums.

COMPARATIVE EXAMPLE 1

(Plate type gum)

A plate-type gum was prepared by the conventional two step process, using the indicated amount of the following gum base materials and chewing gum additives:

| (Gum Base Formulation) | | (Chewing Gum Formulation) | |
|---|---|---|---|
| Natural resin | 25% | Gum base | 20% |
| Vinyl acetate resin | 25 | Powdery sugar | 54 |
| Polyisobutylene | 12 | Glucose | 10 |
| Ester gum | 15 | Starch hydrolysate | 10 |
| Monoglyceride | 3 | Glycerine | 5 |
| Micro-wax | 8 | Flavor | 1 |

-continued

| (Gum Base Formulation) | | (Chewing Gum Formulation) | |
|---|---|---|---|
| Calcium carbonate | 12 | Total | 100 |
| Total | 100 | | |

Preparation of a gum base (the first step):

Polymeric materials consisting of natural resin, synthetic rubber (PIB) and vinyl acetate resin were put into an open-kneader preheated with steam and the mixture was kneaded for about 1.5 to 2 hours while observing the kneading state of the materials and the load of the kneader. Thereafter, ester gum, micro-wax, monoglyceride and calcium carbonate were added successively and the kneading was continued until the homogeneous mass was obtained. The required time (including discharge time) was in the range of 3 to 4 hours and the temperature of the mass was in the range of 110° to 120° C. The total amount of materials was one ton.

Preparation of a chewing gum (the second step):

Thus prepared gum base, starch hydrolysate, glucose and a half amount of powdery sugar were charged into a mixer (1800 Z) and kneaded. Then, the remaining half of the powdery sugar and glycerine were added thereto while observing the kneading state, and the mixture was kneaded until the homogeneous mass was obtained. Finally, the flavor was added and the kneading was continued for one minute. The required time was in the range of about 25 to 30 minutes per ton of materials and the temperature of the mass was in the range of 50° to 60° C. The chewing gum thus prepared was removed and shaped in a conventional manner into the plate type gums.

EXAMPLE 2

(Bubble type gum)

The indicated amount of the following materials were used to produce a bubble type gum in a single step kneading process according to the invention.

| Vinyl acetate resin | 6.2% | Powdery sugar | 50.0 |
|---|---|---|---|
| Ester gum | 5.0 | Starch hydrolysate | 10.0 |
| Polyisobutylene | 3.9 | Glucose | 10.0 |
| Micro-wax | 3.2 | Citric acid | 1.0 |
| Monoglyceride | 3.2 | Colorant | 0.4 |
| Talc | 3.5 | Glycerine | 3.0 |
| | | Flavor | 0.6 |
| | | Total | 100.0 |

The intensive mixer of the same type as used in the Example 1 was charged with vinyl acetate resin, ester gum, polyisobutylene, microwax, monoglyceride, talc, powdery sugar, starch hydrolysate, glucose, citric acid, colorant and glycerine, and then a pressure of about 7 Kg/cm$^2$ was applied on a pressurizing lid, thereby forcing the materials into the mixer. Thereafter, kneading operation was commenced. After the materials were kneaded homogeneously, the lid was removed for adding the flavor and the kneading operation was continued for further one minute. The total required time was in the range of 12 to 15 minutes and the temperature of the mass thus obtained was in the range of 53° to 57° C.

Comparative Example 2 (Bubble type gum)

A bubble type gum was prepared by the conventional two step process, using the indicated amount of the following gum base materials and chewing gum additives:

| (Gum Base Formulation) | | (Chewing Gum Formulation) | |
|---|---|---|---|
| Vinyl acetate resin | 25% | Gum base | 25% |
| Ester gum | 20 | Powdery sugar | 50 |
| Polyisobutylene | 15 | Starch hydrolysate | 10 |
| Micro-wax | 13 | Glucose | 10 |
| Monoglyceride | 13 | Citric acid | 1 |
| Talc | 14 | Colorant | 0.4 |
| Total | 100 | Glycerine | 3 |
| | | Flavor | 0.6 |
| | | Total | 100.0 |

Preparation of a gum base (the first step):

Vinyl acetate resin, polyisobutylene, ester gum and talc were charged into an open-kneader preheated with steam and the mixture was kneaded while observing the load of the kneader and the kneading state. Thereafter, micro-wax and monoglyceride were added successively and the kneading was continued until the homogeneous mass was obtained. The required time (including discharge time) was in the range of 2.5 to 3.0 hours and the temperature of the mass was in the range of 110° to 120° C. The total amount of materials was one ton.

Preparation of a bubble gum (the second step):

Thus prepared gum base, starch hydrolysate, glucose and a half amount of powdery sugar were charged into a mixer and kneaded. Then, the remaining amount of the powdery sugar, citric acid, colorant and glycerine were added thereto and the mixture was kneaded until the homogenous mass was obtained. Finally, the flavor was added and the kneading was continued for one minute. The required time was in the range of 25 to 30 minutes per ton of materials and the temperature of the mass was in the range of 50° to 60° C. The chewing gum thus prepared was removed and shaped in a conventional manner to produce bubble type gums.

Quality Test

Five batches of chewing gum were prepared analogously to the Examples 1 and 2 according to the invention and other five batches of chewing gum as controls were prepared analogously to the Comparative Examples 1 and 2 in the conventional manner, from which were taken each two samples at different sites of each batch. The samples were analyzed for their composition and tested organoleptically. The results were shown in the following.

| | No. | (a) Composition | | | | | |
|---|---|---|---|---|---|---|---|
| | | Gum base | Sugar | Starch hyd. | Glucose | Flavor | Glycerine |
| Conventional Process | 1 | 20.35 | 53.2 | 9.1 | 11.5 | 0.95 | 4.9 |
| | 2 | 19.55 | 54.3 | 9.4 | 10.5 | 1.05 | 5.2 |
| | 3 | 17.58 | 55.1 | 10.2 | 11.1 | 0.92 | 5.1 |
| | 4 | 22.62 | 52.6 | 8.5 | 10.5 | 0.96 | 4.8 |
| | 5 | 23.88 | 52.9 | 8.0 | 9.5 | 1.02 | 4.7 |
| Inventive Process | A | 19.72 | 53.8 | 10.1 | 10.6 | 0.98 | 4.8 |
| | B | 20.68 | 54.1 | 9.8 | 9.4 | 0.92 | 5.1 |
| | C | 21.27 | 52.9 | 9.6 | 10.1 | 1.03 | 5.1 |
| | D | 19.48 | 54.6 | 9.4 | 10.6 | 1.02 | 4.9 |
| | E | 20.01 | 54.0 | 10.3 | 9.8 | 0.99 | 4.9 |

As apparent from the above results, deviation from the average value of composition of the chewing gum according to the invention is slightly smaller than that of the conventional chewing gum.

(b) Organoleptic Test

The chewing gums obtained in accordance with the process of the invention and the conventional process were compared organoleptically by a panel comprising 30 persons. The results were shown in the following table. The values show the average point by 30 persons.

| | Plate Type Gum | | | | | | | | | | Con. Proc. Total | Inv. Proc. Total |
|---|---|---|---|---|---|---|---|---|---|---|---|---|
| | Conventional Process | | | | | Inventive Process | | | | | | |
| | (1) | (2) | (3) | (4) | (5) | (A) | (B) | (C) | (D) | (E) | (1) to (5) | (A) to (E) |
| (1) Chewing hardness | 4.2 | 3.9 | 4.3 | 4.3 | 4.4 | 4.4 | 4.4 | 4.2 | 4.1 | 4.6 | 21.1 | 21.7 |
| (2) Plumpness | 4.4 | 4.2 | 4.2 | 4.3 | 4.3 | 4.3 | 4.5 | 4.4 | 4.1 | 4.7 | 21.4 | 21.7 |
| (3) Smoothness | 4.5 | 4.6 | 4.4 | 4.2 | 4.2 | 4.2 | 4.4 | 4.6 | 4.5 | 4.6 | 21.9 | 22.2 |
| (4) Elasticity | 4.2 | 4.1 | 3.8 | 4.0 | 3.7 | 4.6 | 4.5 | 4.1 | 4.2 | 4.4 | 19.8 | 21.8 |
| (5) Body | 4.3 | 3.1 | 2.9 | 4.5 | 4.7 | 4.6 | 4.8 | 4.6 | 4.3 | 4.5 | 19.5 | 22.8 |
| (6) Uprightness | 4.1 | 3.9 | 3.8 | 3.6 | 3.6 | 4.2 | 4.7 | 4.8 | 4.6 | 4.7 | 19.0 | 23.0 |
| (7) Flavor & taste appearance | 4.5 | 4.1 | 4.5 | 4.7 | 3.9 | 4.5 | 4.4 | 4.2 | 4.1 | 4.6 | 21.7 | 21.8 |
| (8) Balance of flavor & taste | 4.5 | 4.3 | 4.3 | 4.6 | 4.4 | 4.2 | 4.6 | 4.3 | 4.5 | 4.7 | 22.1 | 22.3 |
| (9) Good taste | 4.5 | 4.2 | 4.1 | 4.1 | 4.5 | 4.3 | 4.4 | 4.7 | 4.7 | 4.5 | 21.4 | 22.6 |
| (10) Pyrolytic taste | 3.7 | 3.9 | 4.1 | 3.1 | 3.6 | 4.6 | 4.5 | 4.7 | 4.8 | 4.8 | 18.4 | 23.4 |

```
5     4      3       2       1
|-----|------|-------|-------| Point
Best  Better Medium  Poorer  Poorest
```

As can be seen from the above results, in accordance with the invention, the higher elasticity was obtained and the difference of uprightness was observed possibly due to the difference of pyrolytic odor. The variability in body was higher from batch to batch in case of the conventional process. The greater pyrolytic odor was generated in case of the conventional process, possibly due to the severe conditions of 110° to 120° C. for 3 to 4 hours in the gum base preparation.

| | Bubble Type Gum | | | | | | | | | | Con. Proc. Total | Inv. Proc. Total |
|---|---|---|---|---|---|---|---|---|---|---|---|---|
| | Conventional Process | | | | | Inventive Process | | | | | | |
| | (1) | (2) | (3) | (4) | (5) | (A) | (B) | (C) | (D) | (E) | (1) to (5) | (A) to (E) |
| (1) Chewing hardness | 4.5 | 4.2 | 4.3 | 4.2 | 4.6 | 4.4 | 4.2 | 4.3 | 4.4 | 4.6 | 21.8 | 21.9 |
| (2) Smoothness | 4.3 | 4.5 | 4.5 | 4.4 | 4.3 | 4.5 | 4.6 | 4.3 | 4.3 | 4.4 | 22.0 | 22.1 |
| (3) Swelling rate | 4.2 | 4.4 | 4.2 | 4.3 | 4.1 | 4.1 | 4.4 | 4.3 | 4.3 | 4.5 | 21.2 | 21.6 |
| (4) Swelling size | 4.4 | 4.1 | 4.2 | 4.3 | 4.2 | 4.2 | 4.4 | 4.1 | 4.5 | 4.3 | 21.2 | 21.5 |
| (5) Membrane thickness | 4.2 | 4.1 | 4.3 | 4.4 | 4.1 | 4.5 | 4.4 | 4.5 | 4.3 | 4.7 | 21.1 | 22.4 |
| (6) Body | 4.2 | 4.1 | 4.4 | 4.1 | 4.2 | 4.3 | 4.2 | 4.4 | 4.2 | 4.2 | 21.0 | 21.3 |
| (7) Flavor & taste appearance | 4.2 | 4.2 | 4.4 | 4.3 | 4.2 | 4.4 | 4.3 | 4.5 | 4.5 | 4.2 | 21.3 | 21.9 |
| (8) Balance of flavor & taste | 4.2 | 4.3 | 4.3 | 4.4 | 4.5 | 4.2 | 4.3 | 4.5 | 4.4 | 4.3 | 21.7 | 21.7 |
| (9) Good taste | 4.3 | 4.1 | 4.6 | 4.3 | 4.3 | 4.4 | 4.2 | 4.2 | 4.5 | 4.4 | 21.6 | 21.7 |

```
5     4      3       2       1
|-----|------|-------|-------| Point
Best  Better Medium  Poorer  Poorest
```

As can be seen from the above results, the process according to the invention provides the better results because the polymeric resin was not deteriorated, so that the appropriate membrane thickness may be obtained. Further, the flavor and taste appearance is somewhat clearer in accordance with the invention.

This invention was illustrated herein with the preferred embodiments but should not be limited thereto, and many variation and modification may be effected without departing from the scope and spirit of the invention, for example another type of an apparatus such as a Banbury mixer or a pressure type kneader may be employed in lieu of the intensive mixer as was used in the Examples.

What is claimed is:

1. In a process of preparing a chewing gum which comprises admixing a gum base comprising conventional ingredients with conventional chewing gum additives, the improvement comprising charging all of the ingredients of the gum base and all of the chewing gum additives into a single pressurizing apparatus and kneading said ingredients and additives therein under a pressure of about 4 to 10 kg/cm² for 10 to 25 min. at the mass temperature of about 40° to 60° C. in a single step.

2. A process as claimed in claim 1, wherein the pressure is applied by means of a pressurizing lid.

3. A process as claimed in claim 2, wherein the kneading in the single step is carried out under the pressure of about 6 to 8 Kg/cm².

4. A process as claimed in claim 1, wherein the kneading in the single step is carried out for 12 to 15 minutes.

5. A process as claimed in claim 1, wherein the chewing gum base ingredients are kneaded under pressure simultaneously in the single step with the chewing gum additives excluding the flavor and subsequently the flavor is added for brief flavoring treatment.

6. A process as claimed in claim 1, wherein the kneading in the single step is carried out by means of a single apparatus selected from the group consisting of an intensive mixer, a Banbury mixer and a pressure-type kneader.

* * * * *